United States Patent [19]
Mawatari

[11] Patent Number: 5,969,777
[45] Date of Patent: Oct. 19, 1999

[54] NOISE REDUCTION APPARATUS

[75] Inventor: Masahiko Mawatari, Kanagawa-ken, Japan

[73] Assignee: Kabushiki Kaisha Toshiba, Kawasaki, Japan

[21] Appl. No.: 08/761,824

[22] Filed: Dec. 6, 1996

[30] Foreign Application Priority Data

Dec. 8, 1995 [JP] Japan ................................. 7-320615

[51] Int. Cl.$^6$ .............................. H04N 5/21; H04N 7/32
[52] U.S. Cl. ......................... 348/845; 348/409; 348/607
[58] Field of Search .................................. 348/384, 390, 348/400–405, 409–413, 415, 416, 420, 607, 609, 620, 699, 701, 845, 845.1; H04N 5/21, 7/32

[56] References Cited

U.S. PATENT DOCUMENTS

| | | | |
|---|---|---|---|
| 4,249,210 | 2/1981 | Storey et al. | 348/620 |
| 4,636,856 | 1/1987 | Starck | 348/409 |
| 4,689,671 | 8/1987 | Ohki et al. | 348/416 |
| 4,903,128 | 2/1990 | Thoreau | 358/167 |
| 4,941,043 | 7/1990 | Jass | 348/404 |
| 5,025,316 | 6/1991 | Darby | 348/701 |
| 5,095,354 | 3/1992 | Sokawa et al. | 348/701 |
| 5,161,018 | 11/1992 | Matsunaga | 348/607 |
| 5,185,664 | 2/1993 | Darby | 348/701 |
| 5,343,247 | 8/1994 | Vogel | 348/607 |
| 5,400,083 | 3/1995 | Mizusawa | 348/607 |
| 5,574,512 | 11/1996 | Saeger | 348/607 |
| 5,610,729 | 3/1997 | Nakajima | 348/607 |
| 5,638,139 | 6/1997 | Clatanoff et al. | 348/701 |

FOREIGN PATENT DOCUMENTS 1-501115  4/1989  Japan .
1-181281  7/1989  Japan .

Primary Examiner—Richard Lee
Attorney, Agent, or Firm—Pillsbury Madison & Sutro LLP

[57] ABSTRACT

Noise reduction apparatus comprising, encoder, having a memory for storing picture data of a different picture that was formed from a current picture and a reference picture and a motion detector for detecting the motion between the current picture and the reference picture on block by block basis, for encoding the current picture data or for predictive-encoding the inter-pixel difference between blocks of the current picture data and the reference picture data blocked based on the results of the motion detection, a correlation calculator for calculating at least an additional correlation between a first correlation and a second correlation. The first correlation is between a block-of-interest in the current picture used for the predictive encoding and the reference picture block. The second correlation is between blocks on the periphery of the block-of-interest and the reference picture block, a coefficient calculator for generating a noise coefficient for reducing the noise based on at least the second correlation between the first and second correlations, a noise extractor for extracting the noise component based on the inter-pixel difference between the current picture data and the reference picture data, and the noise coefficient, and subtractor for subtracting the noise component from the input picture data so as to cancel the noise.

15 Claims, 14 Drawing Sheets

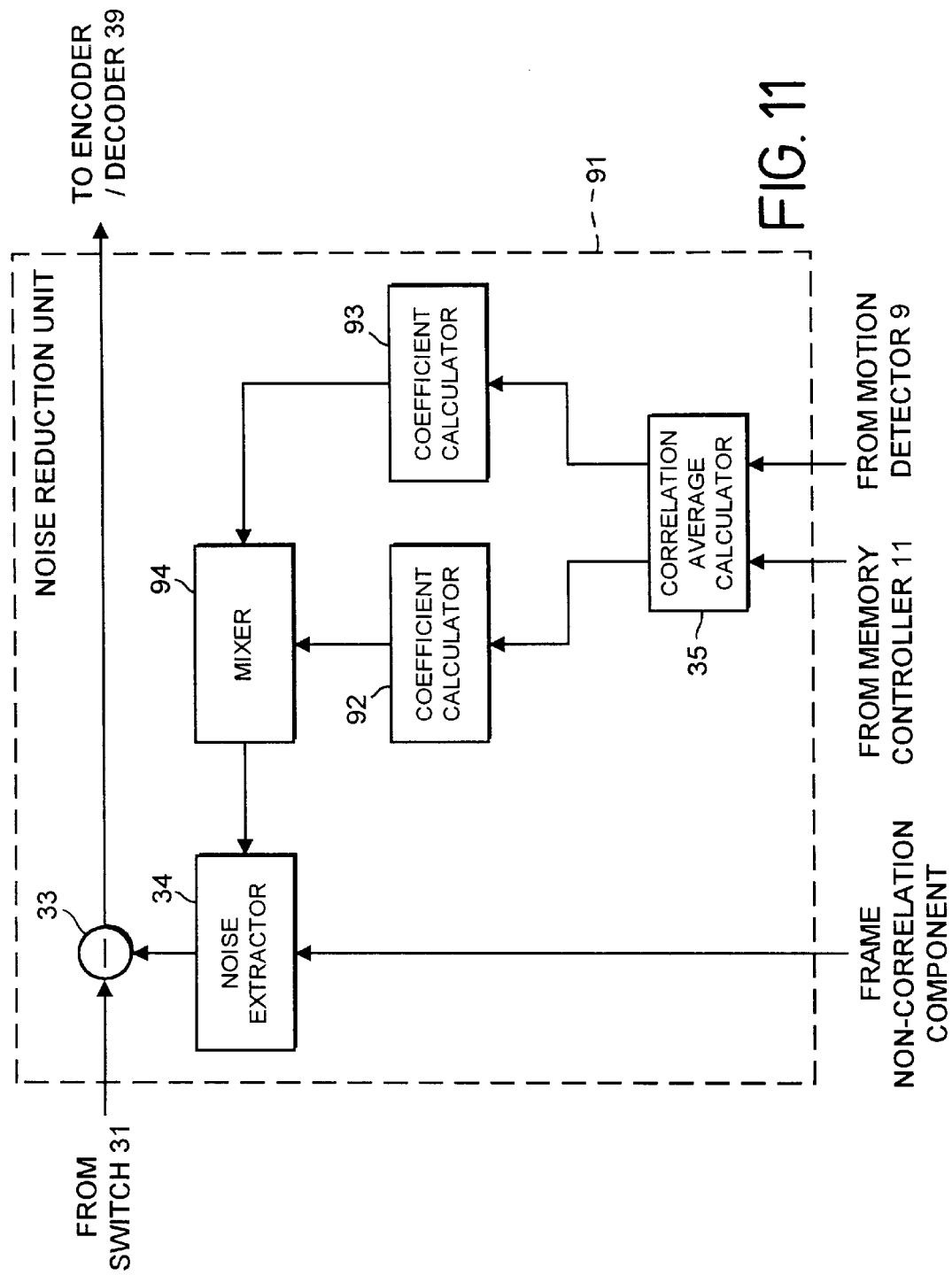

NOISE REDUCTION APPARATUS

FIELD OF THE INVENTION

The present invention relates to the noise reduction apparatus adapted for an encoder and a decoder.

BACKGROUND OF THE INVENTION

Conventionally there have been various systems for reducing the noise contained in the video signal. For instance, one system extracts the noise components from the input video signal and subtracts the noise components extracted from the current video signal so as to be able to reduce the noise. The noise components can be extracted from for example non-correlation component between adjacent horizontal scan lines of the video signal, a field non-correlation component or a frame non-correlation component. The noise reduction apparatus of this nature may be configured in a recursive type or a non-recursive type.

Recently, a digital processing of the picture information has been researched in the aspect of requirement of high picture quality. When the picture is digitized, the data amount of the picture becomes huge. Thus, it is necessary to compress the data for recording and transmitting the data. As the compression method is a high efficiency encoding system that adapts a transform encoding such as a DCT (discrete cosine transform) encoding which has a high compression efficiency and a low main current is currently the compression technique. In the high efficiency encoding system, an input picture signal is divided into blocks each comprised of 8×8 pixels, so as to implement a DCT processing on the DCT blocks on such block by block basis.

This system adapts not only an intra-frame compression which carries out compressions within each frame by the DCT processing but also an inter-frame compression for reducing the redundancy in a time-axis direction using the inter-frame correlation. The inter-frame compression is used to calculate a frame difference between the two successive frames and implement DCT processing for the differential value using the nature that the general motion pictures of two successive frames are similar. Particularly, a motion compensated inter-frame predictive encoding for reducing the prediction error by predicting the picture motion and calculating the inter-frame difference is available.

In such a compression apparatus noises caused by a quantization (quantization noise) are also generated. As a solution, Japanese Patent Application; Tokkai-Hei 4-88795 proposes an apparatus for reducing noises by specifying noise reduction characteristics suitable for a luminance signal and a chrominance signal respectively. Japanese Patent Application; Tokkai-Hei 5-227431 proposes methods for detecting and reducing a mosquito noise which occurs in decoding of the encoded data using DCT. Japanese Patent Application; Tokkai-Hei 4-88795 proposes a decoder in which noise reduction parameters are compared to each other for the chrominance signal and the luminance signal.

Further, Japanese Patent Application; Tokkai-Sho 61-288678 proposes a method for reducing the quantization noise by a suitable prediction vector information at the predictive encoding. Japanese Patent Application; Tokkai-Hei 6-224773 proposes a method for generating noise reduction coefficients responding to quantized outputs and the results of the picture motion detection.

FIG. 15 is a block diagram showing the conventional noise reduction apparatus which is suitable for the encoder and the decoder of the motion picture. FIG. 16 is a block diagram showing a detailed arrangement of an encoder/decoder 39 shown in FIG. 15. An encoder/decoder 4 shown in FIG. 16 is a combination of the devices which are proposed in Japanese Patent Applications; Tokkai-Sho 61-288678 and Tokkai-Hei 6-224773.

A picture signal input through an input terminal 1 is applied to a memory 2 so as to be memorized. From the memory 2, a block of picture data, for example, comprised of 8 pixels along a horizontal scan line×8 lines along in the vertical direction read-out and applied to the encoder/decoder 4 via a subtracter 3. The encoder/decoder 4 encodes the input picture data by the DCT processing, quantization processing and the variable length encode processing and outputs the encoded data through an output terminal 11. Further, the encoder/decoder 4 restores the original picture by decoding the encoded data and outputs the decoded data to the adder 5.

The picture data from the memory 2 is also applied to a motion detector 9. As mentioned above, the motion detection is implemented in the predictive encoding. To the motion detector 9, a picture data of the former frame is applied for example, from a memory 8. The motion detector 9 detects the motion of the picture on a block by block basis by controlling the reading-out of memories 2 and 8 in cooperation with a memory controller 10, so as to provide a motion vector to a memory controller 11 and the encoder/decoder 4. In the inter-frame compression mode, the memory controller 11 controls the reading-out of the memories 2 and 8 based on the motion vector.

It is assumed that the intra-frame compression mode is designated. In this case, a switch 6 selects terminal b and applies "0" to the subtracter 3. Thus, the picture data of the current frame (current signal) is applied to the encoder/decoder 4. The current signal is encoded in the encoder/decoder 4 and then outputted from an output terminal 7. And, the encoder/decoder 4 decodes the encoded data and applies it to an adder 5. To the adder 5, "0" is applied from the switch 6, and the adder applies the decoded picture data to the memory 8 as it is.

It is assumed that the inter-frame compression mode is designated. In this case, the switch 6 selects a terminal a and provides the contents of the memory 8 to the subtracter 3. The memory 8 wherein the decoded picture data of the former picture is memorized provides the stored block picture data at the blocking position based on the motion vector as the motion compensated reference picture data. The subtracter 3 carries out a subtraction between the current signal and the motion compensated reference data so as to calculate the prediction error. The encoder/decoder 4 encodes the prediction error from the subtracter 3 so as to output the encoded data via the output terminal 7.

The encoder/decoder 4 decodes the encoded data so as to apply the decoded data to the adder 5. In this case, the reconstituted data of the prediction error is applied to the adder 5. The adder 5 adds the motion compensated reference picture data from the memory 8 to the prediction error from the encoder/decoder 4 so as to restore the original picture and provides the restored original picture to the memory 8. Thus, the reference picture data to be used in the next encoding operation is stored in the memory 8.

Hereinafter, the encoding of the intra-frame compression mode and the inter-frame compression mode is implemented by the same operation repeatedly.

The operation of the encoder/decoder 4 will be explained in reference to the FIG. 16.

The current signal from the subtracter 3 is applied to a DCT unit 15 of the encoder/decoder 4. The DCT unit 15 converts the input signal from the spatial coordinate axis elements to a frequency component by a two-dimensional DCT processing for a 8×8 pixel block. Accordingly, it is possible to reduce the spatial correlation component. That is, the conversion coefficient output from the DCT unit 15 is applied to a quantizer 16, where the conversion coefficient is quantized with a predetermined quantization range. As a result, the redundancy degree of one block signal is reduced. Here, the quantization range of the quantizer 16 is controlled by a rate controller 21.

The quantized data from the quantizer 16 is applied to a noise reduction (hereinafter referred to NR) unit 17 by a zigzag scan from the horizontal low and vertical lower area toward a higher area in each block. The NR unit 17, as disclosed in the Japanese Patent Application; Tokkai-Hei 6-224773, reduces the noise of the quantized output based on the inter-frame non-correlation component. The inter-frame non-correlation component is containing the original non-correlation component of the signal and the noise component. For instance, the non-correlation component is none (zero) in the freeze-frame picture, and the inter-frame non-correlation component is the noise component. The NR unit 17 determines the original non-correlation component of the signal by the motion vector, and enlarges the NR coefficient as the noise component is large. The NR unit 17 multiplies the inter-frame correlation component by the NR coefficient and subtracts the result of the multiplication from the quantized output so as to reduce the noise.

The output from the NR unit 17 is applied to a variable length coder (hereinafter referred as VLC) 18. The VLC 18 outputs the encoded data by the Huffman encode for the quantized output based on the predetermined variable length code table such as a Huffman code table for instance. Here, in the Huffman encoding, a combination data of the number of "0" succession in the quantized output last (zero run-length) and the bit number of the non-zero coefficient is encoded. Thus, the short bit is assigned to the data which have a high appearance probability, and the long bit is assigned to the data having the low appearance probability. As a result, the transmission data amount will be reduced further more.

The encoded output from the VLC 18 is applied to a buffer 19. The buffer 19 which is constructed by a first-in first-out memory, outputs the input encoded data to the output terminal 7 with a predetermined rate. The generating rate of the encoded output from the VLC 18 is the variable rate. The buffer 19 accommodates the difference between the generating rate of the encoded data and the transmission rate of the transmission channel. Here, the output from the VLC 18 is applied to a rate controller 21 also. The rate controller 21 controls the quantization range of the quantizer 18 based on the amount of the codes generated from the VLC 18 so as to control the generating rate of the encoded data.

The output from the NR unit 17 is also applied to an inverse-quantizer 22 to make the reference picture. The quantized output from the NR unit 17 is inverse-quantized in the inverse-quantizer 22, and implemented the inverse-DCT processing in an inverse-DCT unit 23, so as to restore the original picture data. Here, as mentioned above, the output from the inverse-DCT unit 23 is also the prediction error in case of that the output of the subtracter 13 is the prediction error. The output of the inverse-DCT unit 23 is applied to a non-linear circuit (hereinafter referred to NL) unit 24.

The NL unit 24, as disclosed in Japanese Patent Application; Tokkai-Sho 61-288678, eliminates the quantization distortion (quantization noise) caused by the quantization processing. The NL unit 24 improves the S/N by controlling its output when the level of the inter-frame non-correlation component is small, and reduces the over-shoot on the edge portion by controlling its output when the level is large. The NL unit 24 determines the level of the inter-frame non-correlation component by the motion vector, and controls the non-linear characteristics based on the motion vector, so as to reduce the noise by corresponding with various kinds of pictures. For example, it is possible to reduce the noise clinging on a flat part and that of the freeze part inside of the block containing the movable edge part appropriately. The output of the NL unit 24 is applied to the adder 5.

As mentioned above, in the encoder/decoder 4 as shown in FIG. 16, the noise caused mainly by the current signal is reduced in the NR unit 17 and the noise caused mainly by the quantization, it means the prediction error is reduced in the NL unit 24. As a result, the encoded data which is reduced the noise is obtained.

However, the NR unit 17 and the NL unit 24 determines the levels of the inter-frame correlation components by the motion vectors, and the parameters for deciding its characteristics are controlled on the motion vector on detection by detection basis. That is, the parameter for reducing the noise is changed on block by block basis. As a result, though the noise caused by the predicted distortion and the current signal is reduced, there will be differences of the noise reduction effect on block by block basis. So, there was a drawback that a flickering caused by the differences of the noise reduction effect appears on the picture.

As described above, in the conventional noise reduction apparatus mentioned above had a problem that the noise reduction parameter is controlled by the motion detecting on block by block basis, and the noise reduction effects of every block are different. As a result, the flickering in block appears on the picture.

SUMMARY OF THE INVENTION

It is, therefore, an objective of the present invention to provide a noise reduction apparatus which has enough noise reduction effect and also prevents occurrences of visible picture flickering in each block.

In order to achieve the above object, a noise reduction apparatus according to one aspect of the present invention includes an encoder, having a memory for storing picture data on a different picture from a current picture as that of a reference picture and a motion detector for detecting the motion between the current picture and the reference picture on a block by block basis, for encoding the current picture data or for predictive-encoding the inter-pixel difference between blocks of the current picture data and the reference picture data blocked based on the results of the motion detection, a correlation calculator for calculating at least a second correlation between a first correlation between a block subjected for the noise reduction processing (hereinafter the block will be referred to as block-of-interest) in the current picture used for the predictive encoding and the reference picture block, and the second correlation between blocks on the periphery of the block-of-interest and the reference picture block, a coefficient calculator for generating a noise coefficient for reducing the noise based on at least the second correlation between the first and second correlations, noise extractor for extracting the noise component based on the inter-pixel difference between the current picture data and the reference picture data, and the noise coefficient, and a subtractor for subtracting the noise component from the input picture data so as to cancel the noise.

In order to achieve the above objective, a noise reduction apparatus according to another aspect of the present invention includes a decoder, to which the encoded data caused by the encoding of only the current picture data or by the predictive encoding of the inter-pixel difference between blocks of the current picture data and the reference picture data are inputted, not only for decoding the current picture data and the inter-pixel difference by decoding the encoded data but also the current picture data by adding the decoded difference between pixels to the reference picture data read-out from the memory by using the memory for storing the reference picture data, a correlation calculator, to which outputs are applied from the decoder and the memory, for calculating at least a second correlation from a first correlation between the block-of-interest in the current picture and the second one between the blocks near the block-of-interest in the current picture and the reference picture block, a coefficient calculator for generating a noise coefficient based on at least the second correlation between the first and the second correlations to reduce the noise, a noise extractor for extracting the noise components based on the inter-pixel difference between the current picture data and the reference picture data and the noise coefficient, and a subtractor for eliminating the noise by subtracting the noise component from the picture data to be input.

In the noise reduction apparatus of the first aspect, the correlation calculator calculates at least a second correlation between blocks on the periphery of the block-of-interest and the reference picture block within a first correlation between the block-of-interest in the current picture and the reference picture block and the second correlation between the blocks on the periphery of the block-of-interest and the reference picture block.

The noise extractor extracts the noise component based on the picture data of the current picture and the that of the reference picture and the Since the noise coefficient is generated using the second correlation between the reference picture block and the blocks on the periphery of the block-of-interest in the current picture, the dispersion of the extracted noise components in each block is low.

The subtractor cancels the noise components in the picture data and applies it, for example, to the encoder. Thus, the encoded data from the encoder has a small difference of noise eliminating effects in each block.

In the noise reduction apparatus of the second aspect, the decoder restore the original picture data from the encoded data.

The correlation calculator to which the picture data from the decoder and the reference picture data from the memory are inputted, calculates at least a second correlation between a first correlation between the current picture block and the reference picture block and the second correlation between the block-of-interest in the current picture and the reference picture block.

The coefficient calculator generates the noise coefficient based on at least the second correlation between the first and the second correlation.

The noise extractor extracts the noise component based on the inter-pixel difference between the current picture data and the reference picture data and the noise coefficient. Since the noise coefficient is generated using the second correlation between the reference picture block and the blocks on the periphery of the block-of-interest in the current picture, the dispersion of the extracted noise component in each block is small.

The subtractor cancels the noise component in the picture data so as to apply to the memory. Thus, the decoded picture data from the decoder has a small difference of noise eliminating effects in each blocks.

Additional objective and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 11 is a block diagram showing another embodiment of the present invention;

DESCRIPTION OF THE PREFERRED EMBODIMENTS

Figure 1:
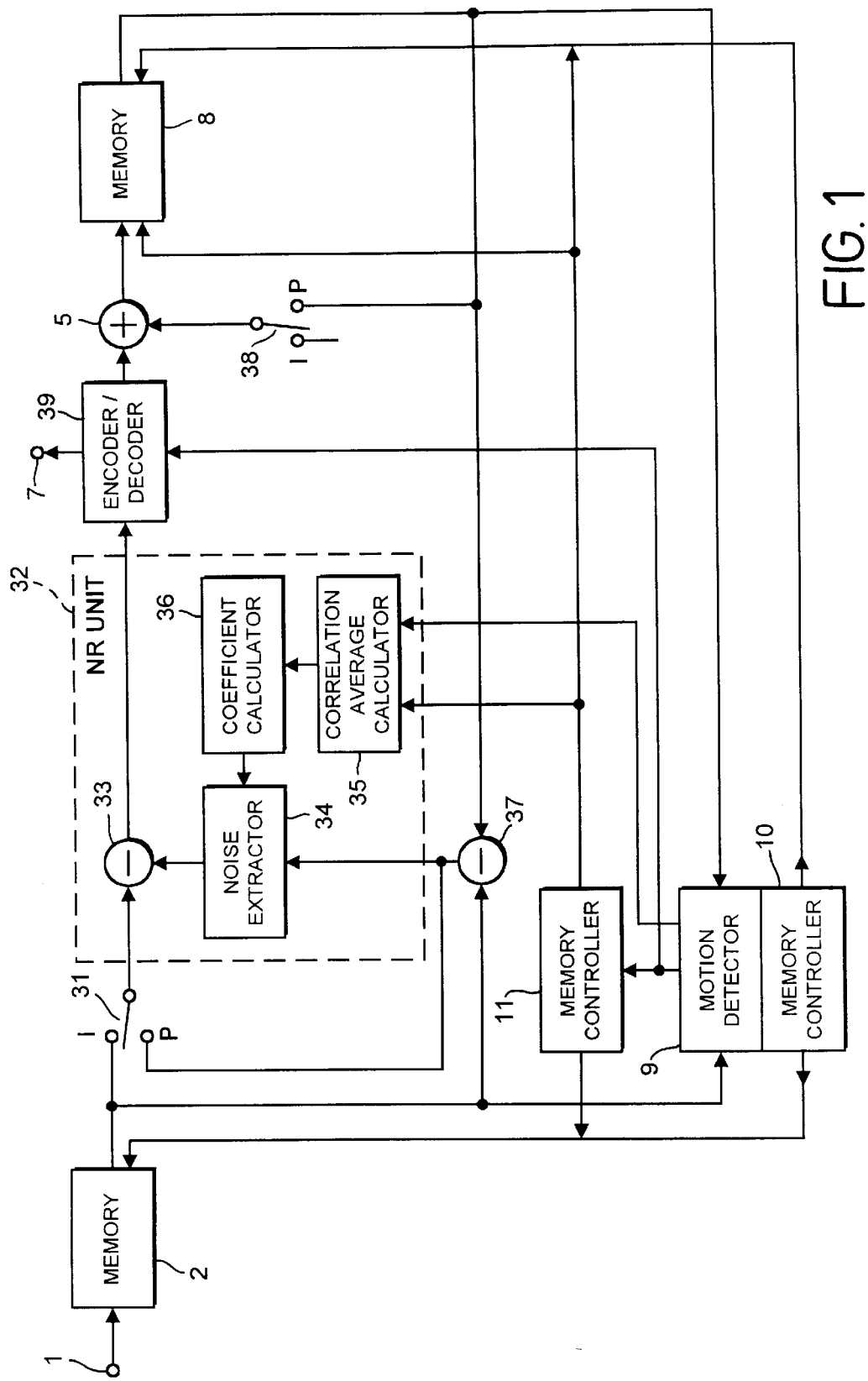
FIG. 1 is a block diagram showing one embodiment of the noise reduction apparatus according to the present invention.
Figure 15:
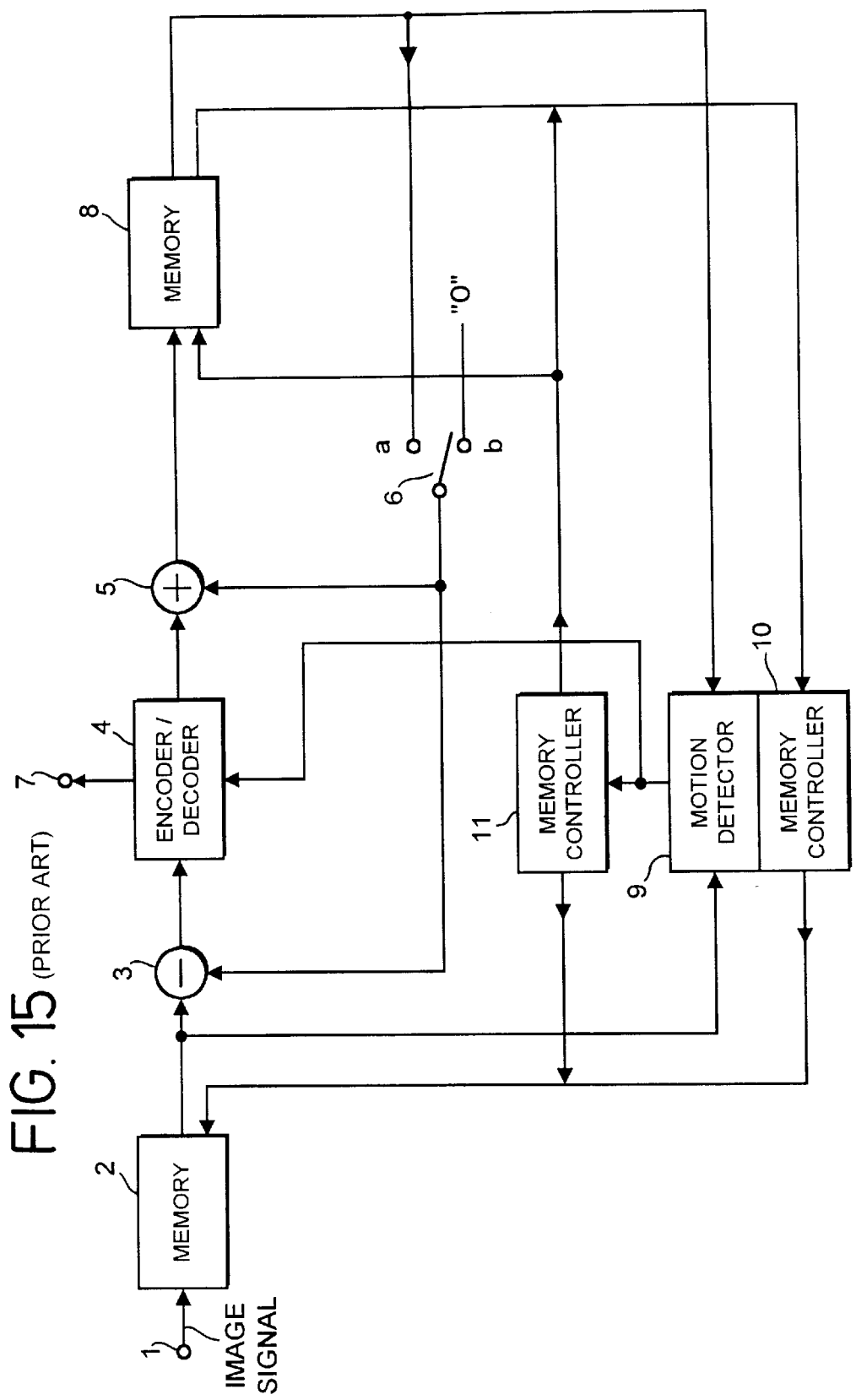
FIG. 15 is a block diagram showing the conventional noise reduction apparatus.

Embodiments of the present invention will be explained in detail hereinafter in reference to the attached drawings. FIG. 1 is a block diagram showing one embodiment of the noise reduction apparatus according to the present invention. In FIG. 1, the same components as those shown in FIG. 15 are assigned with the same marks.

A picture signal is inputted input terminal 1. The picture signal is applied to a memory 2 and memorized on frame units. The memory 2 reads-out the picture data on a block by block basis. Each block each, for example, comprises 8×8 pixels in both horizontal and vertical directions. The picture data from the memory 2 is applied to not only a. noise reduction unit 32 via a terminal I of a switch 31, but also to a motion detector 9 and a subtracter 37. The switch 31 selects the terminal I and provides "0" to a subtracter 33 in the intra-frame compression mode, and selects a terminal P and provides the prediction error from the subtracter 37(described after) to the subtracter 33 in the inter-frame compression mode. The subtracter 37 calculates the prediction error and the non-correlation component. The motion detector 9 detects the operation of the input picture signal and outputs not only the motion vector but also the signal showing the inter-frame non-correlation component.

Figure 2A:
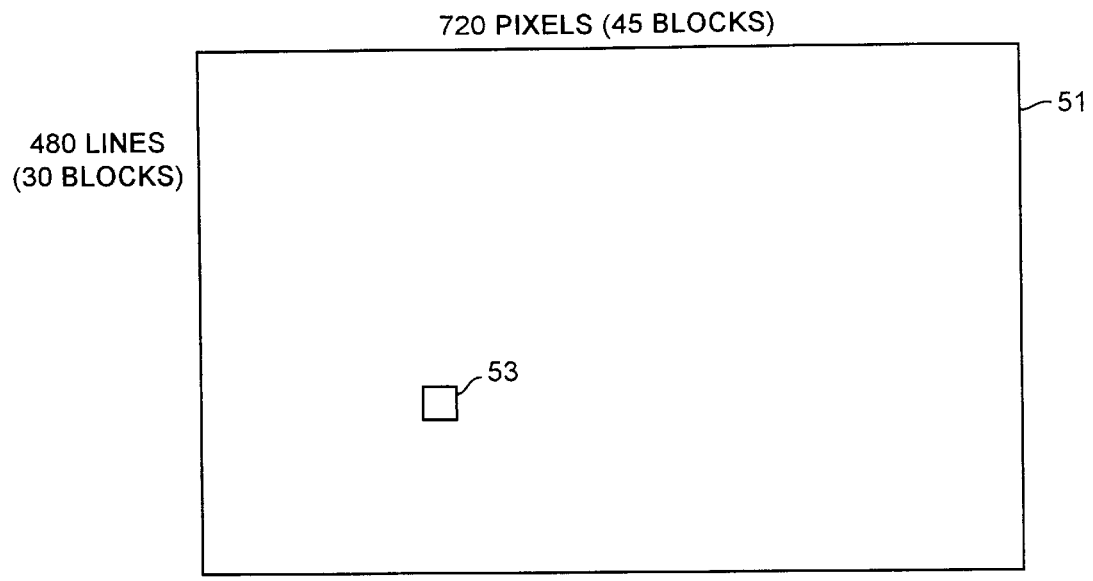
FIGS. 2A and 2B are flow charts for explaining the motion detection.
Figure 2B:
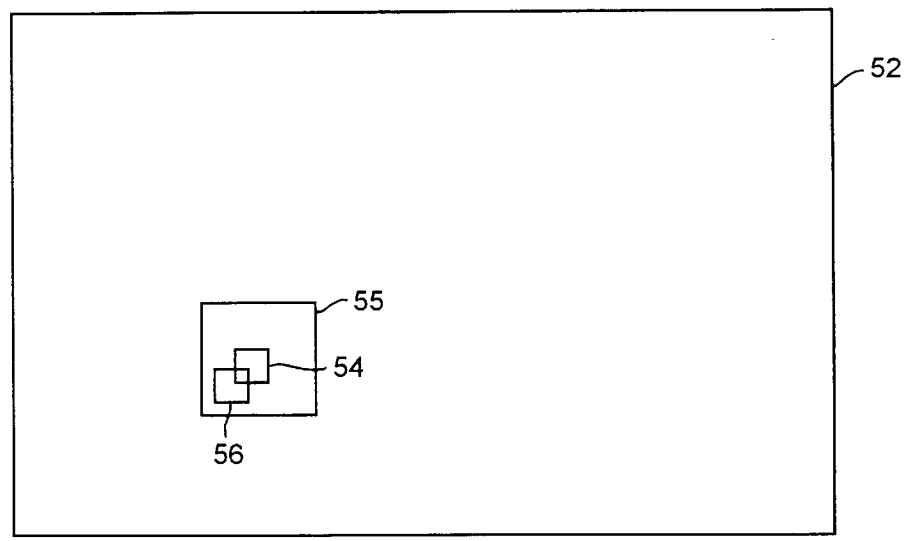
Figure 3:
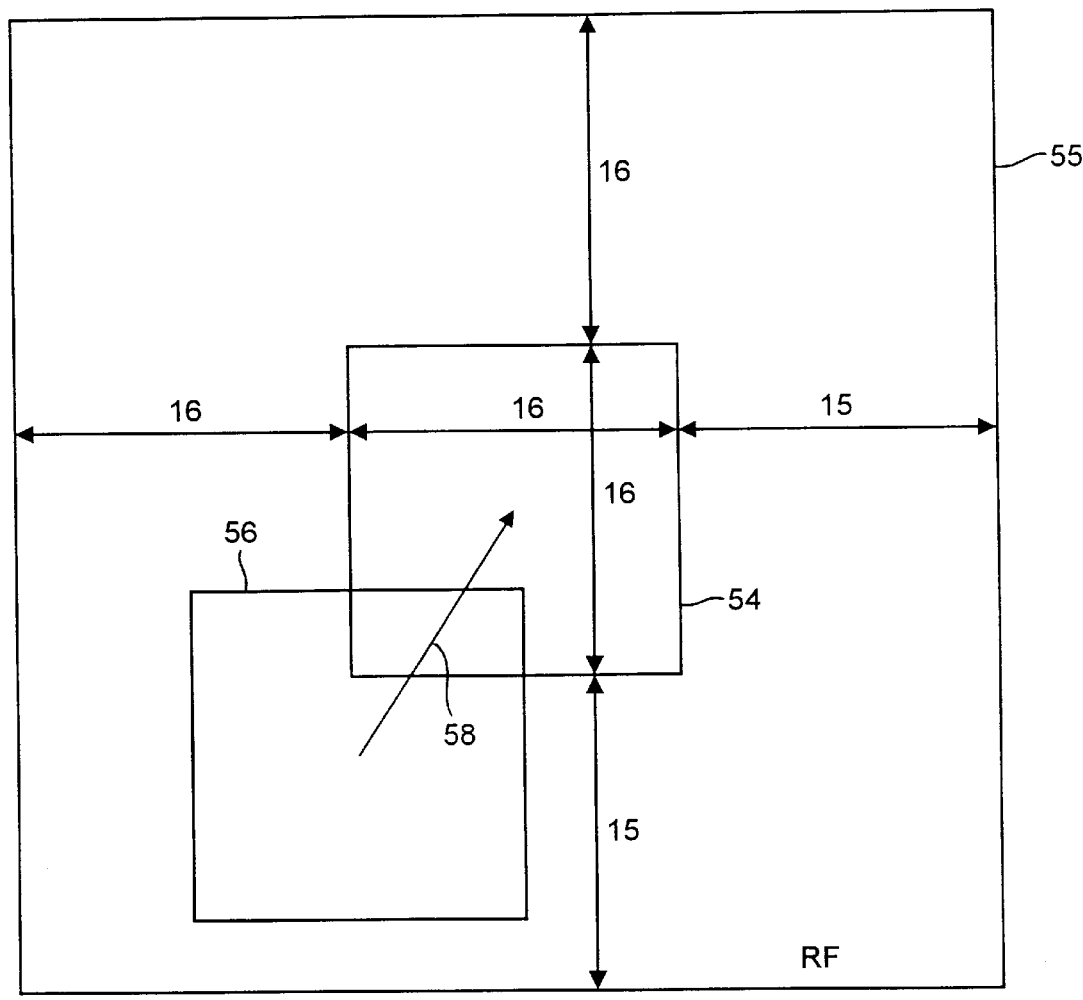
FIG. 3 is a flow chart for explaining the motion detection.
Figure 4:
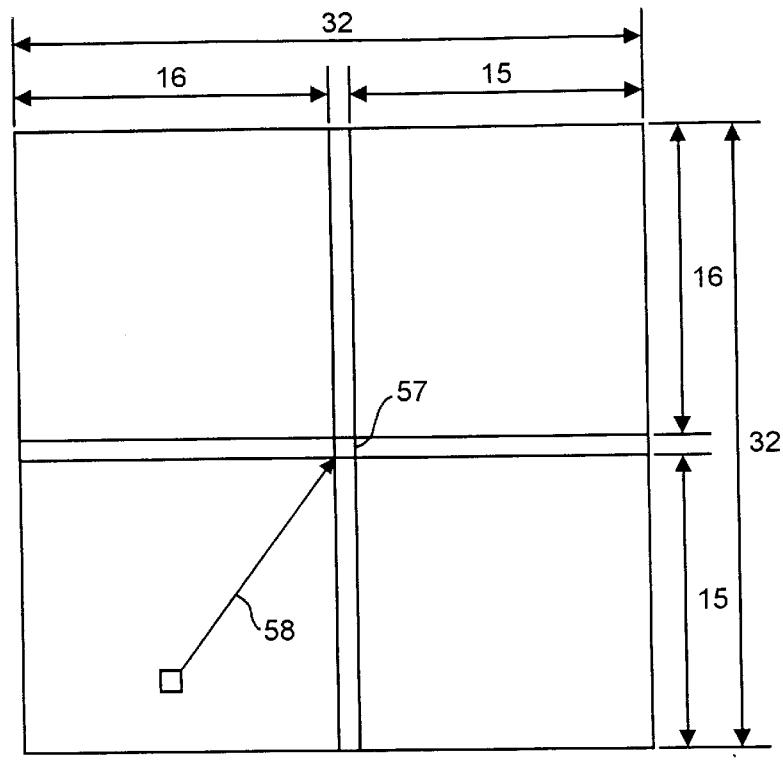
FIG. 4 is a flow chart for explaining the motion detection.

FIGS. 2 through 4 illustrate the motion detector 9 shown in FIG. 1. FIG. 2a shows the current frame picture and the FIG. 2b shows the reference frame picture.

To the motion detector 9, the current frame picture data from the memory 2 and the reference frame (reference picture) picture data from a memory 8 (as described later) are input. The motion detector 9 implements the motion detection in block by block base. For instance, if it is assumed that the DCT block is comprised of 8×8 pixels, and four luminance DCT blocks have the same size with one chrominance difference DCT block by a sampling frequency difference between the luminance signal and the chrominance difference signal, the motion detector 9 implements the motion detection on the four luminance DCT blocks (equals to one chrominance difference DCT block), that is, macroblocks comprising 16×16 pixels, on block by block basis.

It is assumed that the motion of the block-of-interest (macro-block) 53 which encodes a current frame 51 as shown in FIG. 2a is detected. In this case, the motion detector 9 takes the relative position relationship of the block-of-interest 53. Here, a search area 55 centering around the block 54 of a reference frame 52 is set up. FIG. 3 shows the expansion of the search area 55 shown in FIG. 2a. In FIG. 3, the search area 55 takes the dimensions of 47×47 pixels.

The motion detector 9 searches the block having most resembling pattern to the pattern of the block-of-interest 53 of the current frame 51 inside of the search area 55. That is, the motion detector 9 sets up the blocks in turns by moving them on pixel by pixel basis inside the search area 55, and implements the matching operation for accumulating the absolute value of the difference between pixels which are correspond to each other between the block 53 and the block defined in the search area 55, so as to make the block which has the smallest accumulating value as a reference picture block.

FIG. 4 shows the 1 pixel in the block 54 within the search area 55. The pixel 57 is an arbitrary pixel in the block 54. FIG. 4 shows the area where the pixel 57 and other pixel to be carried out the matching operation therebetween are able to take in the search area 55. That is, a matching operation is carried out between the pixel 57 and 32×32 pixels. So, there are 32×32=1024 blocks which are able to be set up within the search area 55.

The motion detector 9 calculates the vector 58 showing the position relationship between the block 54 and the reference picture block which is a block having the smallest accumulated value calculated by the matching operation as the motion vector. The motion detector 9 provides not only the calculated motion vector to a memory controller 11 and the encoder/decoder 39, but also the correlation between the reference picture block which are calculated on the process of the motion vector operation and the current frame block to a correlation average calculator 35 of a noise reduction unit 32.

In the embodiment, it is using the correlation calculated on the process of the motion detection. However, it may use that calculated by other processing. By using the correlation calculated on the motion vector operation, it can make the hardware for the correlation calculation useless, and also it makes the processing time for the correlation calculation shorter.

A memory controller 10 controls the read-out of the memories 2 and 8 in the motion detecting time controlled by the detector 9. Further, a memory controller 11, to which the motion vector frame the motion detector 9 is applied, controls the read-out of the memory 8, so as to design the blocking position of the reference block. Further, the memory controller 11 outputs the controlling signal for controlling the storing and calculating process timing in the correlation average calculator 35. The subtracter 37, to which the current frame picture data from the memory 2 and the reference picture data from the memory 8 are applied, carries out a subtraction between the current and reference picture data so as to produce the inter-frame correlation component to be applied to a noise extractor 34. The subtracter 37, to which the current block data and the reference block data are applied from the memories 2 and 8 also, carries out a subtraction between the current and reference picture data so as to produce the prediction error to be applied to a terminal P of a switch 31.

The noise reduction unit 32 is comprised of the subtracter 33, the noise extractor 34, the correlation average calculator 35 and the coefficient calculator 36. The picture data from the switch 31 is applied to the subtracter 33 of the noise reduction unit 32. The inter-frame non-correlation component from the subtracter 37 is applied to the noise extractor 34. In the noise reduction unit 32, the noise extractor 34 extracts the noise component based on the inter-frame non-correlation component and the NR coefficient, while the subtracter 33 subtracts the noise component from the input picture data. Thus the noise reduction unit 32 cancels the noise.

Figure 5:
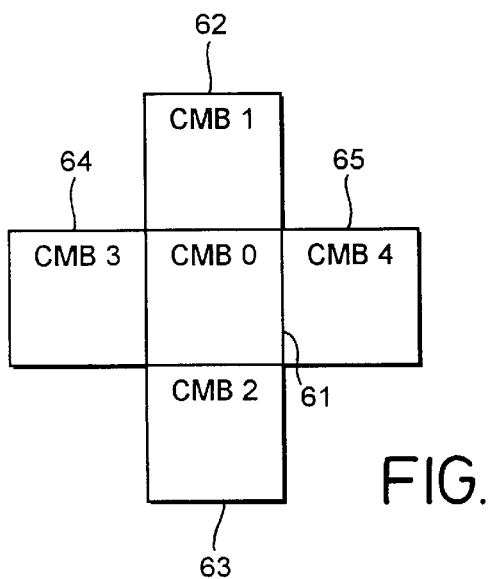
FIG. 5 is a flow chart for explaining the average of the correlations.

In this embodiment, the NR coefficient is calculated not only by the correlation between the reference picture block and the current frame block which is compressing (hereinafter referred to a block-of-interest), but also by the correlation between the blocks on the periphery of the block-of-interest the current frame and the reference picture block which correspond to the blocks. FIG. 5 illustrates the correlation average calculator 35.

It is assumed that the block-of-interest 61 and its peripheral blocks 62 through 65. Further, it is also assumed that the correlation which corresponds to the motion vector between the block-of-interest 61 and the reference block in the reference frames to designated as CMBO (CMB stands for Current Macro Block). Also, respective correlations which correspond to the motion vectors between blocks 62 through 65 and the respective reference frame blocks are designated as CMB1 through CMB4. The correlation average calculator 35, which has a memory storing the correlation CMB0 calculated about the block-of-interest 61 in the current frame and the correlations CMB1 through CMB4 calculated about the blocks 62 through 65, calculates the average of these correlations and provide the average value to the coefficient calculator 36.

The average calculation implemented in the correlation average calculator 35 is not limited to the arithmetic averaging. It may be implemented by the geometrical average calculation, or filtering operation such as the weighted average.

The coefficient calculator 36 calculates the NR coefficient based on the average value of the input correlation. The coefficient calculator 36 makes the NR coefficient small when the average value of the correlation is large, and makes it large when the value is small.

The noise extractor 34 extracts the noise component from the non-correlation component output from the subtracter 37 using the NR coefficient so as thus applying the noise component to the subtracter 33. For instance, the noise extractor 34 extracts the noise component by multiplying the non-correlation component with the NR coefficient. The subtracter 33 subtracts the noise component from the input picture data, and provides the picture data removed the noise component to the encoder/decoder 39.

Figure 16:
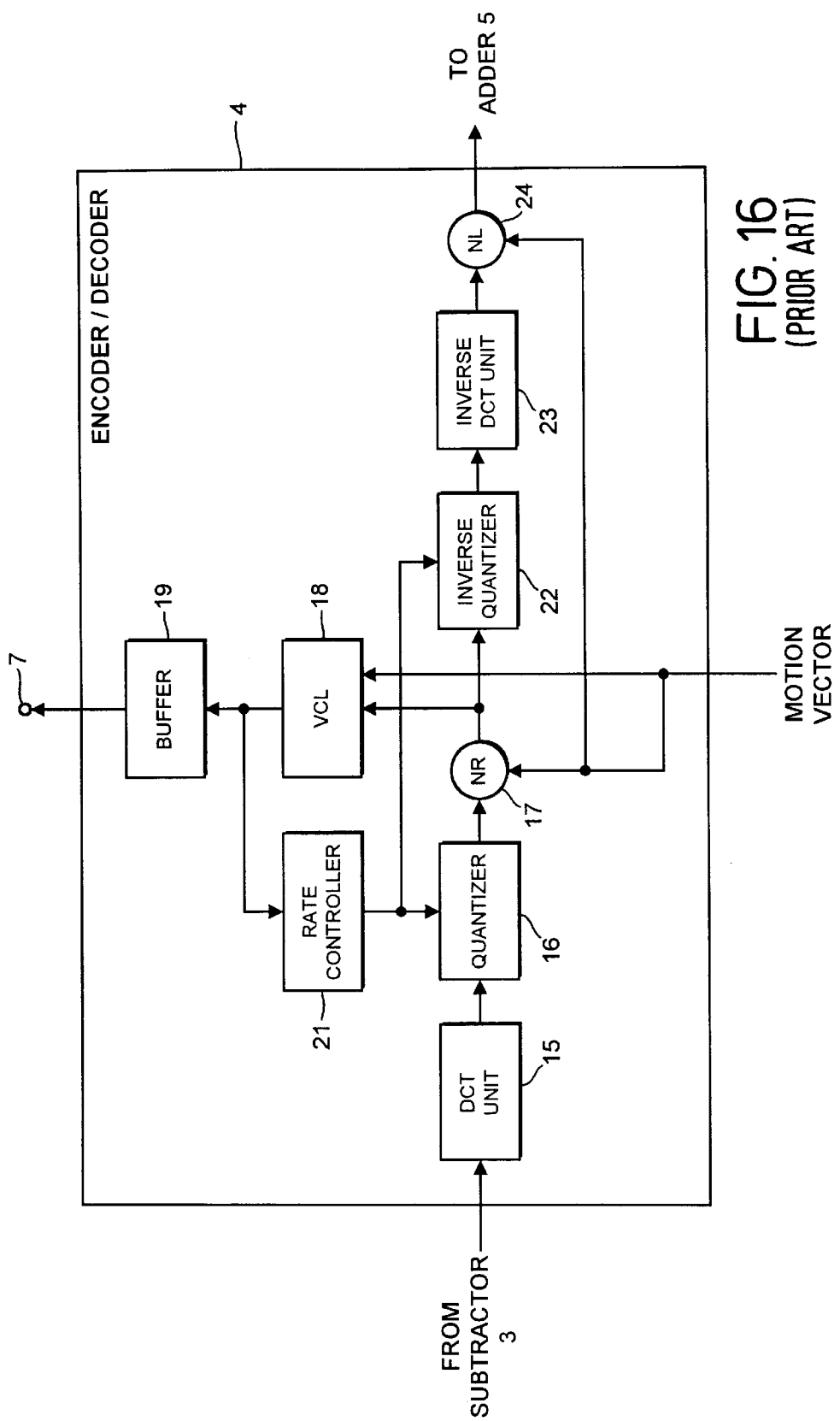
FIG. 16 is a block diagram showing the detailed arrangement of the encoder/decoder 4 in FIG. 15.

The encoder/decoder 39 has almost the same components as the FIG. 16, but it does not have the NR unit 17 and the NL unit 24. The encoder/decoder 39 implements the quantization of the input picture data by the DCT processing and implements the variable-length encode so as to output the encoded data through the output terminal 7. The encoder/decoder 39 implements the inverse-DCT processing by implementing the inverse-quantization on the encoded data so as to restore the original picture data which is as the same as that before the DCT processing and provide the restored picture data to the adder 5. When the prediction error is inputted to the encoder/decoder 39, the picture data applied to the adder is also prediction error.

The output from the adder 5 is applied to the adder 5 via the memory 8 and the terminal P of the switch 38. The memory 8 stores the output from the adder 5 as the reference picture data. The switch 38 selects the terminal I and applies O to the adder 5 in the time of the intra-frame compression mode, and selects the terminal P and applies the reference picture data read-out from the memory 8 to the adder 5 in the time of the inter-frame compression mode. In case of the inter-frame mode, the adder 5 adds the decoded data from the encoder/decoder 39 to the reference picture data so as to restore the original picture data and memorize it to the memory 8.

Figure 6:
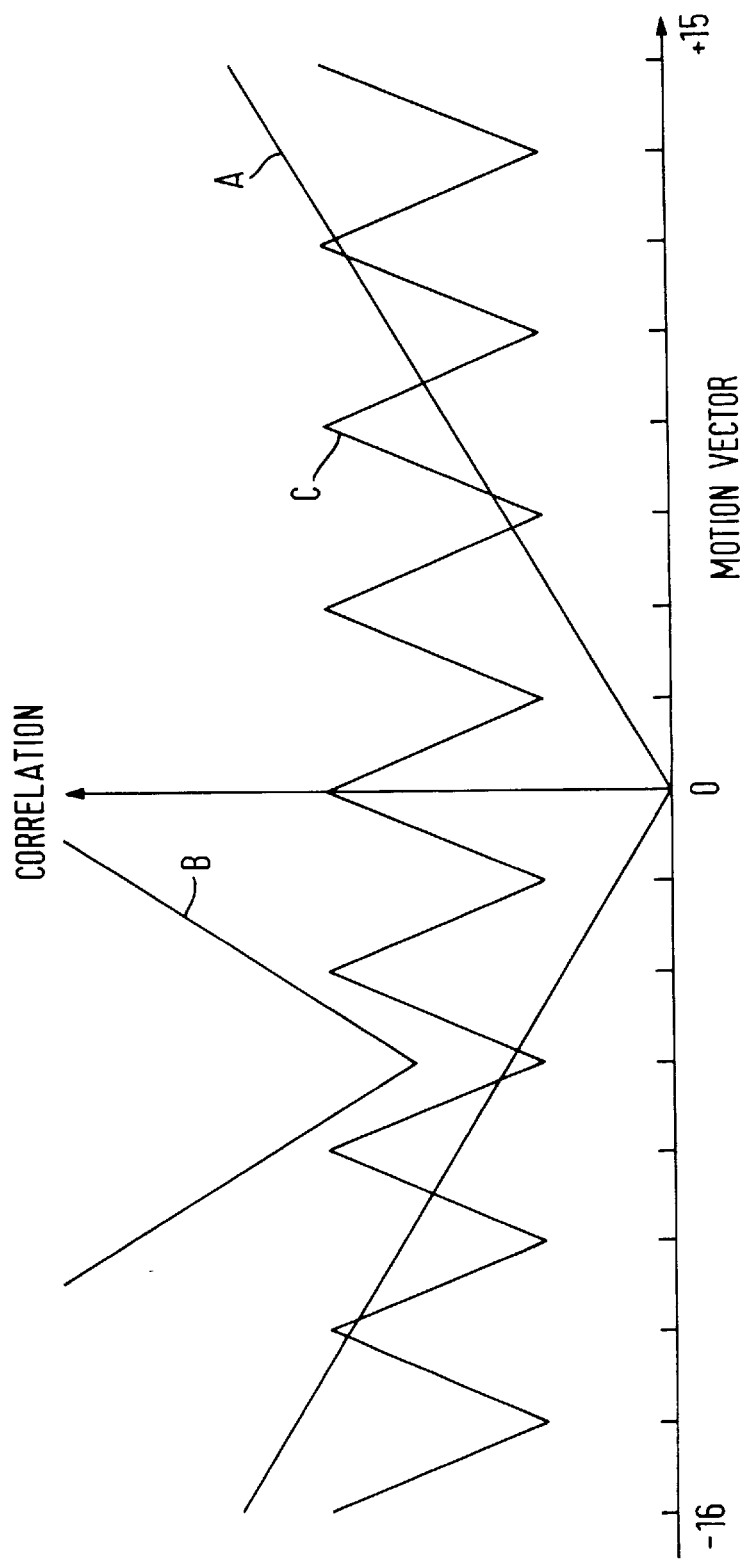
FIG. 6 is a graph showing the relationship between the motion vector and the correlation.
Figure 7:
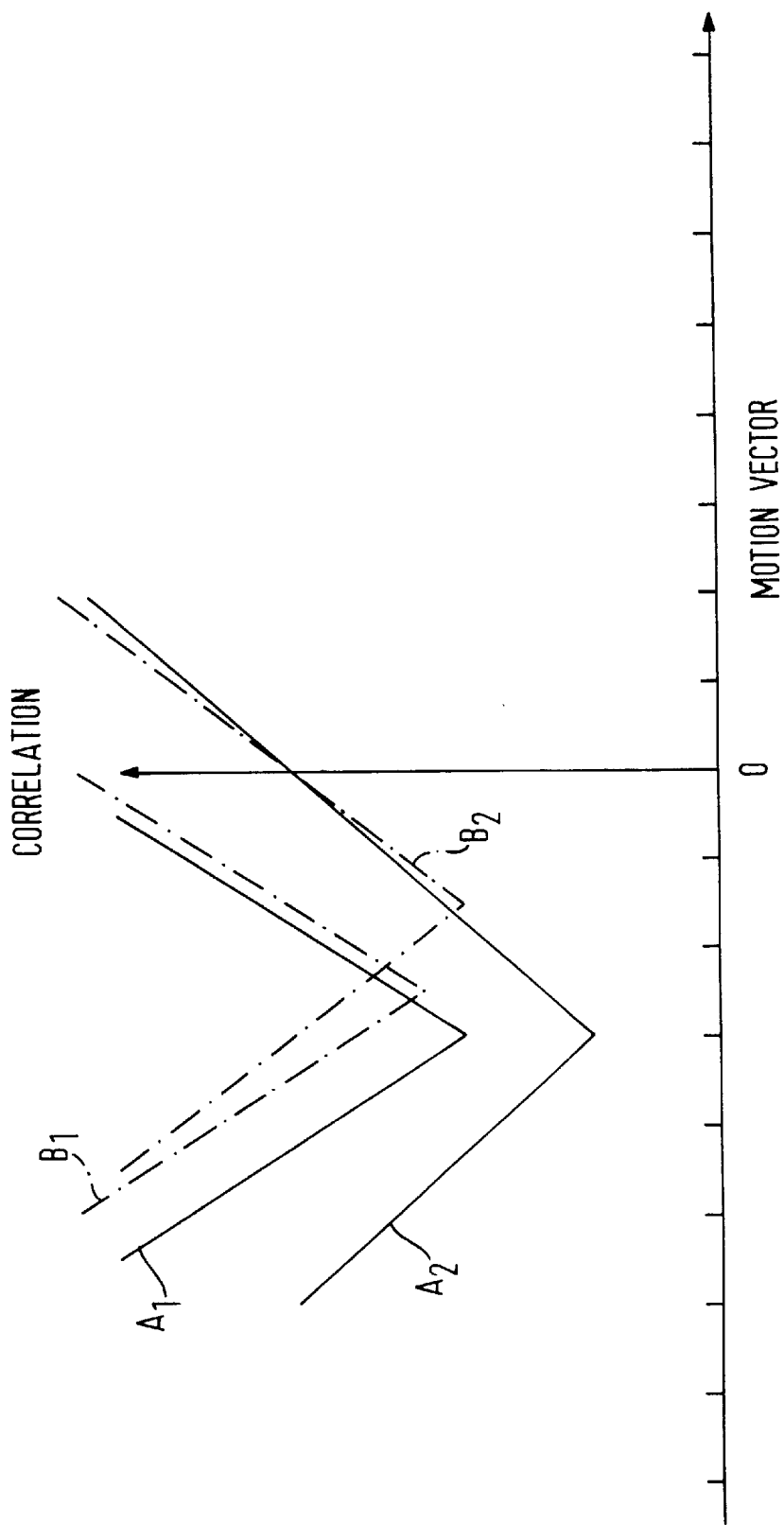
FIG. 7 is a graph for showing the relationship between the motion vector and the correlation in the conventional system.
Figure 8:
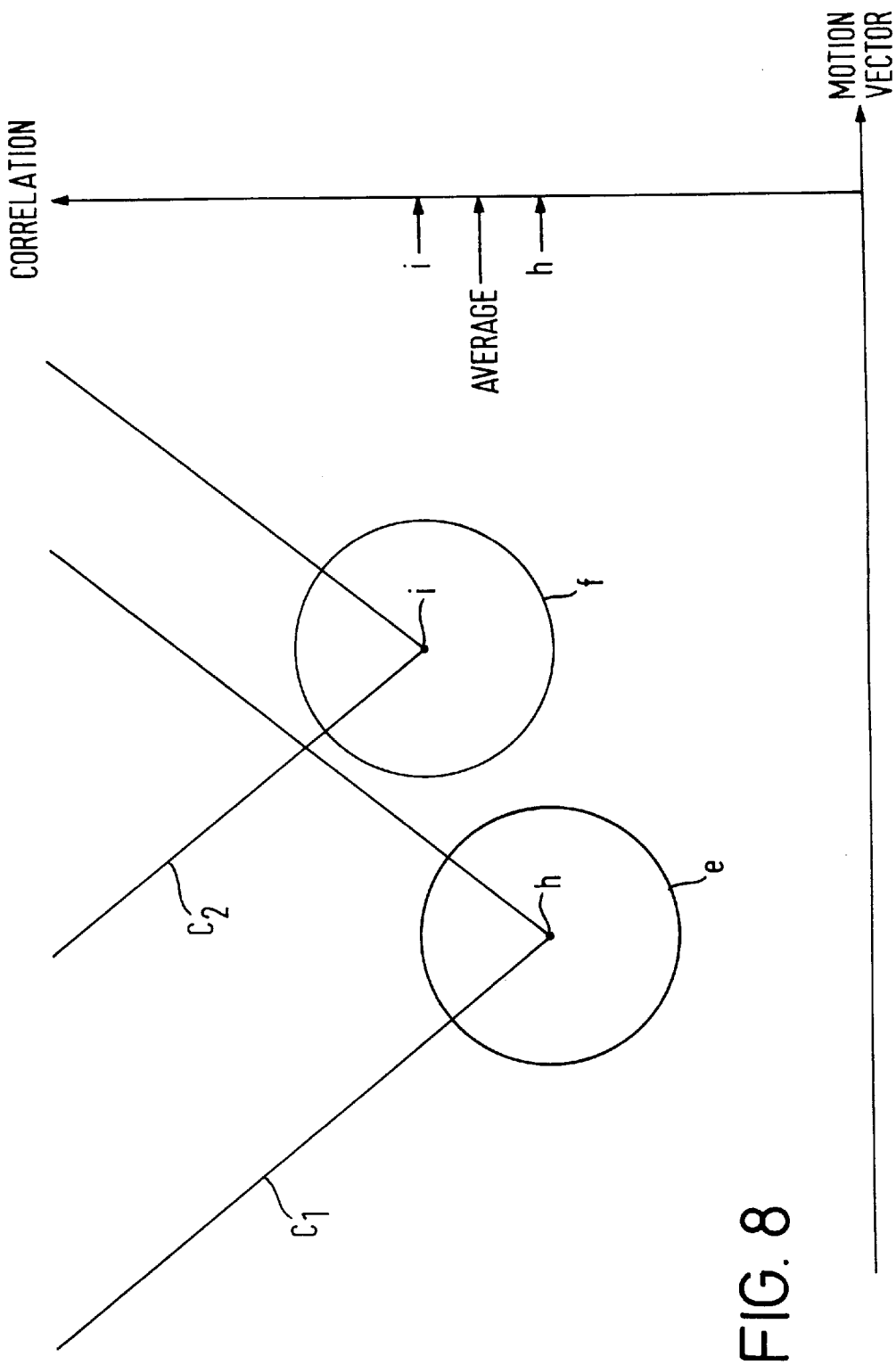
FIG. 8 is a graph for explaining the effect of the embodiment shown in FIG. 1.
Figure 9:
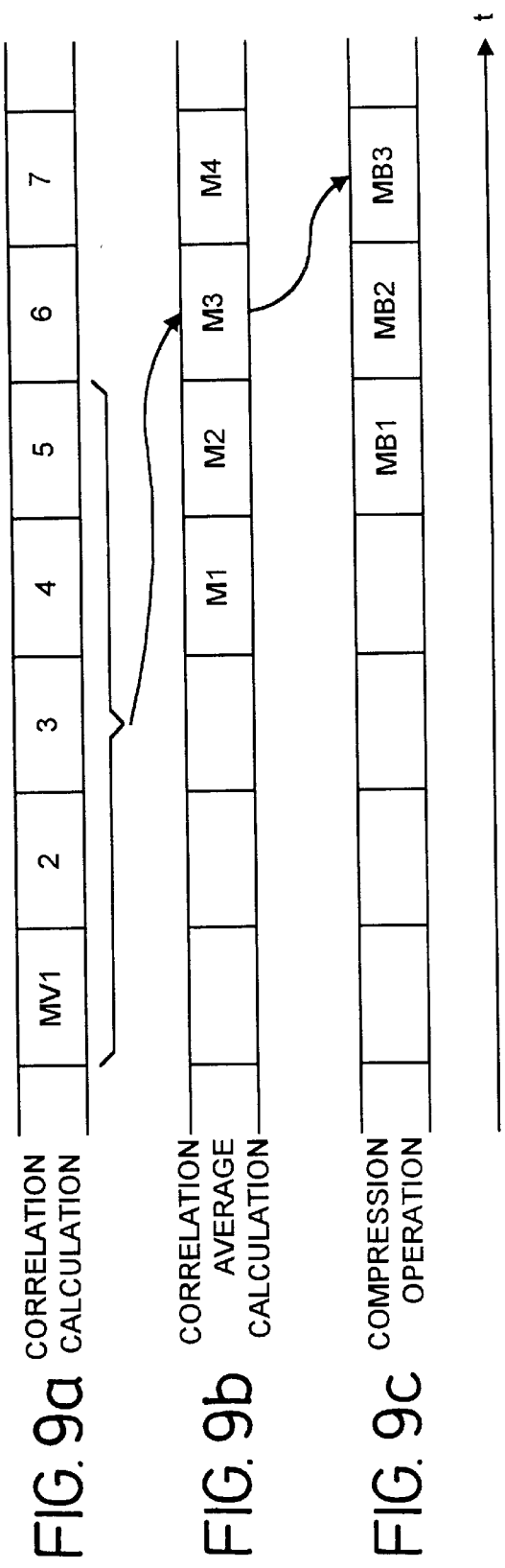
FIGS. 9A to 9C are is a flow charts for explaining the motion of the embodiment of FIG. 1.

The operation of the embodiment comprised as described above will be explained in reference to the graphs in FIGS. 6 through 8 and the flow chart of FIG. 9. In FIG. 6, the relation between the motion vector calculated for various kinds of pictures and the correlation by taking the motion vector amount of the horizontal or vertical direction on the horizontal axis, and taking the correlation on the vertical axis. In FIGS. 7 and 8, the relation between the motion vector for the quantization and the correlation is shown. FIG. 7 illustrates the relation in the conventional system, while FIG. 8 illustrates the relation in the embodiment of the present invention. Here, the larger the correlation, the similitude relation of the picture patterns becomes lower. While the smaller the correlation, the similitude relation of the picture patterns becomes higher. FIG. 9 illustrates the timing chart of the various calculations.

The picture signal input via the input terminal 1 is blocked in the memory 2. After that, it is applied to not only to the terminal I of the switch 31, but also to the subtracter 37 and the motion detector 9. Here, it is assumed that the intra-frame compression mode is specified. In this case, since the switches 31 and 38 select the terminal I, the picture data from the memory 2 is supplied to the noise reduction apparatus 32 via the switch 31.

The subtracter 37 produces the inter-frame non-correlation component by carrying out a subtraction between the current frame picture data and the picture data from the memory 8, and provides the inter-frame non-correlation component to the noise extractor 34. The motion detecting block 9 calculates the correlation between the reference picture block data from the memory 8 and the current frame block data and provides the correlation to the correlation average calculator 35. The correlation average calculator 35 averages the correlation calculated for the block-of-interest in the current picture flame and the blocks on the periphery of the block-of-interest.

It is assumed that the correlation average calculator 35 calculates the average of the correlation operated for the five blocks including the block-of-interest of the current frame and four blocks in either sides of the block-of-interest. FIG. 9 shows the calculation timing of this case. FIG. 9a shows the calculation of the correlation, FIG. 9b shows the average value calculation, and FIG. 9c shows the compression operation. Here, the numbers are showing the block numbers for processing. These blocks 1, 2, 3, . . . are arranged from the left side to the right side of the screen.

In FIG. 9, it is assumed that MV1, MV2, MV3, . . . are showing the correlations of the blocks 1, 2, 3, . . . which form a line from left side to right side of the screen. The encode is orderly implemented from the left side block to the right side block. Now, it is also assumed that the block-of-interest is designated by the reference numeral 3. The correlation average calculator 35 stores also correlations MV1 and MV2 at the timing of inputting the correlation MV3 which is correspond to the block-of-interest 3. The correlation average calculator 35 does not calculate the average value till the correlations MV4 and MV5 which are corresponding to the two blocks on the right side of the block-of-interest are input.

The correlation average calculator 35, which is controlled by the memory controller 11, calculates the average value M3 among the correlations MV1 through MV5 as shown in FIG. 9b and provides the average value M3 to the coefficient calculator 36 when the correlations MV1 through MV5 are input thereinto. Thus, the compression operation to the block-of-interest 3 is implemented at the timing of inputting the block 7 as shown in FIG. 9.

Here, since the average calculation of the correlations is completed in relatively short time, its possible to implement the average calculation in the compression processing time. In the case of selecting the blocks in the vertical sides of the block-of-interest as its on the periphery of blocks, it just causes a greater processing time delay.

The average value of the correlation calculated in the correlation average calculator 35 is applied to the coefficient calculator 36. The coefficient amount calculator 36 calculates the NR coefficient based on the average of these correlations and provides the NR coefficient to the noise extractor 34. The noise extractor 34 multiplies the inter-frame non-correlation component from the subtracter 37 with the NR coefficient, so as to extract the noise component. The subtracter 33 cancels the noise component in the picture data applied through the switch 31, so as to provide the data removed the noise component to the encoder/decoder 39.

The encoder/decoder 39 encodes the picture data and outputs the encoded data through the output terminal 7. Further, the encoder/decoder 39 decodes the encoded data and applies the decoded data to the adder 5. In this case, the switch 38 is selecting the terminal I. As a result, the adder 5 passes the output of the encoder/decoder 39 therethrough as it is. The output of the adder 5 is stored in the frame memory 8 as the reference picture.

It is assumed that the inter-frame compression mode is specified. In this case, the switches 31 and 38 select the terminal P. The motion detector 9m detects the motion on block by block basis by the matching operation between the current picture data from the memories 2 and 8 and the reference picture data. The motion detector 9 not only provides the calculated motion vector to the encoder/decoder 39, but also the motion detector 9 calculates the correlation between the current frame block and the reference picture block and provides the correlation to the correlation average calculator 35. The correlation average calculator 35 averages not only the correlations regarding to the block-of-interest, but also other four blocks of each two blocks in either back and fourth sides of the block-of-interest, so as to output the average to the coefficient calculator 36. The coefficient calculator 36 calculates the NR coefficient based on the average value of the coefficient amounts. Then, also in this case, the noise component is extracted based on the average value of the coefficient amounts calculated about the block-of-interest of the current frame and its peripheral blocks. The decreasing motion of the noise component is as the same as the intra-frame compression mode.

The subtracter 37 produces the prediction error by carrying out a subtraction between the current block data and the reference picture block data, and provides the prediction error to the terminal P of the switch 31. In the inter-frame compression mode, the subtracter 33 cancels the noise component from the prediction error applied thereto. The encoder/decoder 39 encodes the prediction error. The adder 5 restores the original picture by adding the reference picture data from the memory 8 to the decoded prediction error, and stores the restored picture data in the memory 8 as the reference picture data to be used at a next encoding operation.

In FIG. 6, the graph A shows a picture pattern of comparatively flat and stationary like a blue sky. The graph B shows a picture pattern of rapid change and motion. The graph C shows a picture pattern of moving picture having the periodically high frequency components. Here, for instance, in the picture pattern which the random noises are superposed on the 50% of the white signals, the characteristics will be fixed value in proportion to the noise amount (not shown).

FIG. 7 shows the difference of characteristics between the each blocks and each frames which are adjacent to in the picture pattern of graph B in FIG. 6., The graphs Al and B1 are showing the picture patterns of the predetermined two blocks a and b which adjoin with each other in FIG. 7. The graphs A2 and B2 are showing the quantized picture data of the blocks a and b in the conventional embodiment.

As shown in the graphs A1 and B1 in FIG. 7, each blocks a and b nest to have the comparatively same character in the relation between the correlations and the motion vector amounts before the quantization. However, in case of the quantization for the compassing s shown in the graphs A2 and B2, the character between the adjoining blocks a and b has a great difference. That is, when the quantization range is relatively narrow or the quantization is not implemented, the dispersion of the correlations and the vector amounts between adjoining blocks will be great compared that the quantization range is relatively wide. This dispersion is supposed to be caused by the quantization distortion.

FIG. 8 shows the characteristics of the embodiment with the motion vector amount shown on the axis of abscissas and the correlations between the reference picture block and the current picture block on the axis of ordinates. The graphs C1 and C2 in FIG. 8 shows the picture pattern of the blocks a and b which are nest to each other, both of which are showing the picture pattern of rapid change and motion And, the graphs C1 and C2 are showing the character when there are no noise and quantization error.

At block a, as shown in graph C1, in the relation between the motion vector and the correlation, the more the coordinates goes away from the minimum value dot h, the greater the value becomes. That is, the dot h shows the reference picture block having a minimum correlations to the block-of-interest a. At the adjacent block b, as shown in graph C2, in the relation between the motion vector and the correlation, the more the coordinates go away from the minimum value dot i, the greater the value becomes. That is, the dot i shows the reference picture block having the minimum correlations to the block-of-interest b. Here, in the motion detector 9, the vector and scalar amounts at the dots h and i with the minimum correlations are output as their motion vectors.

The correlation average calculator 35 calculates the average of the correlations at the dots h and i. The average value of the correlation value has a relationship; the correlation at the dot i≧the average of the correlations≧the correlation at the dot h.

When there are noises only, or there are both noises and the quantization errors, the coordinates of the motion vectors to the blocks a and b spread out from the centers of the dots h and i. The circles e and f in FIG. 8 are showing the spreading areas.

Generally, the motion vector 5 calculated from the reference picture block to the block a and from the reference picture block to the block b has the same size. This is that when the average of the correlations is calculated over the research area in FIG. 3, the three half of the reference picture block which can get, in the adjoining blocks.

The direction of the correlations caused by the noise and the quantization is generated at random. That is, the correlations of the block a and its reference picture block can be shown by an arbitrary dot in the circle e, and the correlations of the block b and its reference picture block can be shown by an arbitrary dot on the circle f. Since the dispersion becomes random, the dispersion amounts of the average value between each blocks a and b and these each reference picture blocks are highly possible to be converged in comparatively small value, which might be smaller than the dispersion amounts of each correlations between the blocks a and b and these each reference picture blocks. Thus, the dispersion of the average value of the correlations between the blocks a and b and each these. reference picture blocks can be shown by circles smaller than the circles e and f. That is, by taking an average, the low-pass filter characteristics is given, and the dispersion of the average value of the correlations becomes smaller.

Accordingly, its better to use the average of the correlations calculated for the block-of-interest and its peripheral blocks rather than the correlation of only the block-of-interest for reducing the flickering of each block.

When there is no noise, and only the quantization error is generated, the dispersion of the motion vector does not make a circle, and expand in the predetermined direction in a specific picture pattern. However, since the picture patterns themselves are not the same in the random process, it can reduce the flickering in each block by averaging the dispersion amounts to reduce them.

Accordingly, in the embodiment, it calculates not only the correlations between the block-of-interest of the current frame and the reference picture block, but also the correlations between the blocks on the periphery of the block-of-interest and their own reference picture blocks. As a result, it cancels the noise component based on the average value of these correlations. This average of the correlations has smaller dispersion than that between each block-of-interest and their reference picture blocks. That is, by controlling the parameter of the noise reduction using the block-of-interest and its peripheral blocks, it can make the noise reduction effects difference between blocks smaller than the case of controlling the parameter for noise reduction on block by block basis. As a result, it can prevent the flickering of each block appearing on the picture.

Figure 10:
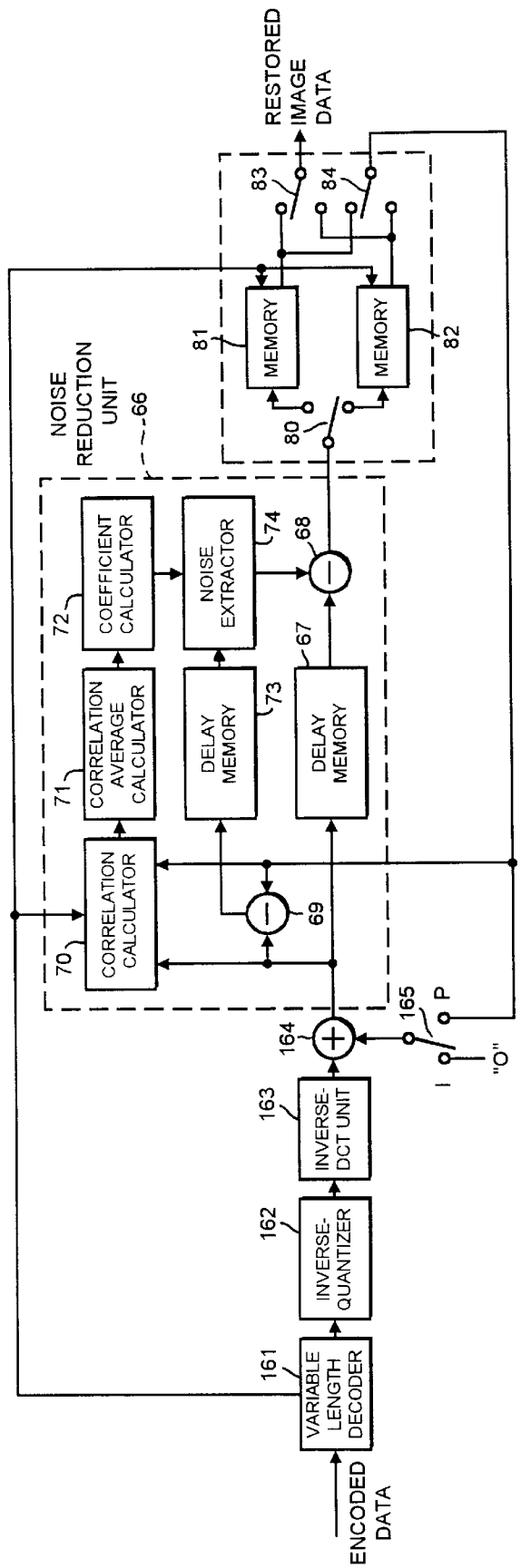
FIG. 10 is a block diagram showing another embodiment of the present invention.

FIG. 10 is a block diagram showing another embodiment of the present invention. This embodiment shows the example which is appropriate to the decoding apparatus for decoding the encoded data which are encoded by adapting the predictive encoding.

The encoded data from the encoding system containing the inter-frame encoding are applied to a variable length decoder 161. The variable length decoder 161 implements the variable length decode to the input encoded data and applies them to an inverse-quantizer 162. The inverse-quantizer 162 restores the data before the quantization by the inverse-quantization processing and provides the restored data to an inverse-DCT unit 163. The inverse-DCT unit 163 restores the pixel data before the DCT processing by the inverse-DCT processing of the inverse-quantized output and provides the restored pixel data to an adder 164. Here, the variable length decoder 161 implements the variable length decode to the motion vector of the input encoded data to be output therefrom.

The switch 165 selects the terminal I at the intra-frame compression mode and provides "0" to the adder 164, and at the inter-frame compression mode, it selects the terminal P and provides the motion guaranteed reference picture block data from memories 81 and 82 (mentioned later) to the adder 164. The adder 164 restores the original picture data by adding the output from the inverse-DCT unit 163 with the output from the switch 165.

The output from the adder 164 is applied to a subtracter 68 via a delay memory 67 of a noise reduction unit 66. The subtracter 68, to which the noise component is applied from a noise extractor 74 (mentioned later), cancels the noise component in the decoded picture data, and provides them to the memories 81 and 82 via the switch 80. The contents of the memories 81 and 82 are output as the decoded picture data via the switch 83. The blocking positions of the switches 81 and 82 are controlled based on the motion vector, and the stored decoded picture data are output via the switch 84 as the motion guaranteed reference picture block data. The switches 80, 83, and 84 are changed by connected with each other, when the write-in is implemented in one of the memories 81 and 82, the read-out is implemented from the other one. The reference picture block data from the memories 81 and 82 are applied to the terminal P of the switch 165, the subtracter 69 and the correlation calculator 70 via the switch 84.

In the embodiment, the noise reduction unit 66 comprised of the subtracters 68 and 69, the correlation calculator 70, the delay memories 67 and 73, the correlation average calculator 71, the coefficient calculator 72 and the noise extractor 74. To the correlation calculator 70 the motion vector transmitted in conjunction with the encoded data is applied. The correlation calculator 70 calculates the correlation between the current frame block data and the reference picture block data from the motion vector and provides the correlation to the correlation average calculator 71. In this embodiment, the correlation average calculator 71 memorizes not only the correlation of the block-of-interest of the current frame, but also the correlation calculated about the blocks on the periphery of the block-of-interest, and it calculates the average value of these correlations. The correlation average calculator 71 provides the average of the correlations to the coefficient calculator 72. The coefficient calculator 72 generates the NR coefficient based on the average of some correlations and provides the NR coefficient to the noise extractor 74.

The current frame block data and the reference picture block data are also applied to the subtracter 69. The subtracter 69 produces the difference between these two block data as the inter-frame non-correlation component, and then provides the inter-frame non-correlation component to the noise extractor 74 via the delay memory 73. The delay memories 67 and 73 delay input data by about the calculation time of the correlation average calculator 71. The noise extractor 74, for instance, extracts the noise component by multiplying the inter-frame non-correlation component with the NR coefficient and provides the noise component to the subtracter 68.

The operation of the embodiment in such arrangement as mentioned above will now be explained.

The encoded data are subjected to the variable length decode in the variable length decoder 161. The output from the variable length decoder 161 is implemented inverse-quantization in the inverse-quantizer 162, then implemented the inverse-DCT processing in the inverse-DCT unit 163 so as to restore the original pixel data. When the encoded data have been implemented the predictive encoding the output from the inverse-DCT unit 163 is prediction error. In this case, the adder 164 adds the reference picture block data from the memories 81 and 82, and the output from the inverse-DCT unit 163 so as to restore the original picture. The decoded picture data from the adder 164 are applied to both the subtracter 69 in the noise reduction unit 66 and the correlation calculator 70.

Both the subtracter 69 in the noise reduction unit 66 and the correlation calculator 70 are also applied the outputs from the memories 81 and 82. The subtracter 69 produces the inter-frame non-correlation component by carrying out a subtraction between the reference picture block data from the memories 81 and 82 and the current frame block data, and then provides the inter-frame non-correlation component to the noise extractor 74 via the delay memory 73. The correlation calculator 70 calculates the correlation between the reference picture block and the current frame block and provides the correlation to the correlation average calculator 71. The correlation average calculator 71 memorizes not only the block-of-interest, but also the correlations of the blocks on the periphery of the block-of-interest, and it calculates the average value of these correlations. The average value is applied to the coefficient calculator 72.

In the coefficient calculator 72, the noise coefficient based on the average value of the correlations is calculated and applied to the noise extractor 74. In the noise extractor 74, the noise component is extracted by multiplying the non-correlation component by the NR coefficient. The subtracter 68 subtracts the noise component from the input decoded picture data and provides the difference via the delay memory 67.

The output from the noise reduction unit 66 is memorized in the memories 81 and 82 via the switch 80. The picture data stored in the memories 81 and 82 are output as the decoded picture data via the switch 83.

If the input encoded data is resulted from the intra-frame compression, the switch 165 applies "0" to the adder 164. The adder 164 applies the output of the inverse-DCT unit 163 to the noise reduction unit 66 as it is. Other operations are the same as that in the case that the inter-frame compression encoded data are input.

As described above, in this embodiment, the correlation average calculator 71 averages the correlation of the block-of-interest of current frame block and its reference picture block and those of the blocks on the periphery of the block-of-interest and their own reference picture blocks. The coefficient calculator 72 calculates the NR coefficient based on the average of these blocks. Accordingly, it can be able to reduce the flickering of each block.

Here, in this embodiment, the correlation calculator 70 calculates the correlation between the reference picture block and the current frame block. However, by calculating these amount at the encoding time and transmitting them, it becomes possible to omit the calculation of the correlation at the decoder section. In this case, the correlation calculator 70 is not necessary.

Further, in the present embodiment, the noise reducing operations are recursively implemented by allocating the noise reduction apparatus in the decoding loop. However, it is obvious that the noise reduction apparatus may also be allocated outside the decoding loop.

FIG. 11 is a block diagram showing a noise reduction unit 91 in another type according to the present invention. In FIG. 11 the same components as those shown in FIG. 1 are assigned with the same marks.

In the embodiment, the part that the noise reduction unit 91 is substituted for the noise reduction unit 32 is different from the embodiment in FIG. 1. In the noise reduction unit 91, the parts that the coefficient calculators 92 and 93 are substituted for the coefficient calculator 36 as shown in FIG. 1, and a mixer 94 is also provided, in different from the noise reduction unit 32 in FIG. 1. The motion detector 9 produces the correlation between the reference picture block and the current frame block to the correlation average calculator 35. The correlation average calculator 35 produces the correlation of the block-of-interest of the current frame to the coefficient calculator 92. Further, it calculates the average of the correlations of the blocks on the periphery of the block-of-interest and applies it to the coefficient calculator 92. Here, the correlation average calculator 35 produces the correlation and the average value at the same timing.

The coefficient calculator 92 calculates the NR coefficient based on the correlation between the block-of-interest of the current picture frame and its reference block and provides it to the mixer 94. The coefficient calculator 93 calculates the NR coefficient based on the correlations between the blocks on the periphery of the block-of-interest and their own reference picture blocks and provides them to the mixer 94. The mixer 94 selects one of the NR coefficients output from the coefficient calculators 92 and 93 or mixes them at a fixed rate, so as to provide the selected NR coefficient to the noise extractor 34.

The operation of the embodiment in such arrangement will now be explained.

The motion detector 9 applies the correlation between the reference picture block and the current frame block to the correlation average calculator 35. The correlation average calculator 35 memorizes the input correlation and provides the average of the correlation to the blocks on the periphery of the block-of-interest in the current frame to the coefficient calculator 93. Also, the correlation average calculator 35 provides the correlation to the block-of-interest in the current frame to the coefficient calculator 92. The coefficient calculator 92 produces the NR coefficient based on the correlation to the block-of-interest, and the correlation calculator 93 produces the NR coefficient based on the average value of the correlation to the blocks on the periphery of the block-of-interest.

The mixer 94, for instance, selects one of the NR coefficients output from the coefficient calculators 92 and 93 and applies it to the noise extractor 34. When it selects the output of the coefficient calculator 93, it is possible to reduce the flickering of each block. However, contrary, it selects the output of the coefficient calculator 92 it is possible to obtain a proper noise reduction effect for each block.

Further, the mixer 94 mixes the outputs from the coefficient calculators 92 and 93 at the proper ratio and applies it to the noise extractor 34, so as to obtain the desirable noise reduction characteristics.

As described above, in this embodiment, it can obtain the same effect as that shown in FIG. 1, and also it can obtain the noise reduction effect which is desired by viewer.

Figure 12:
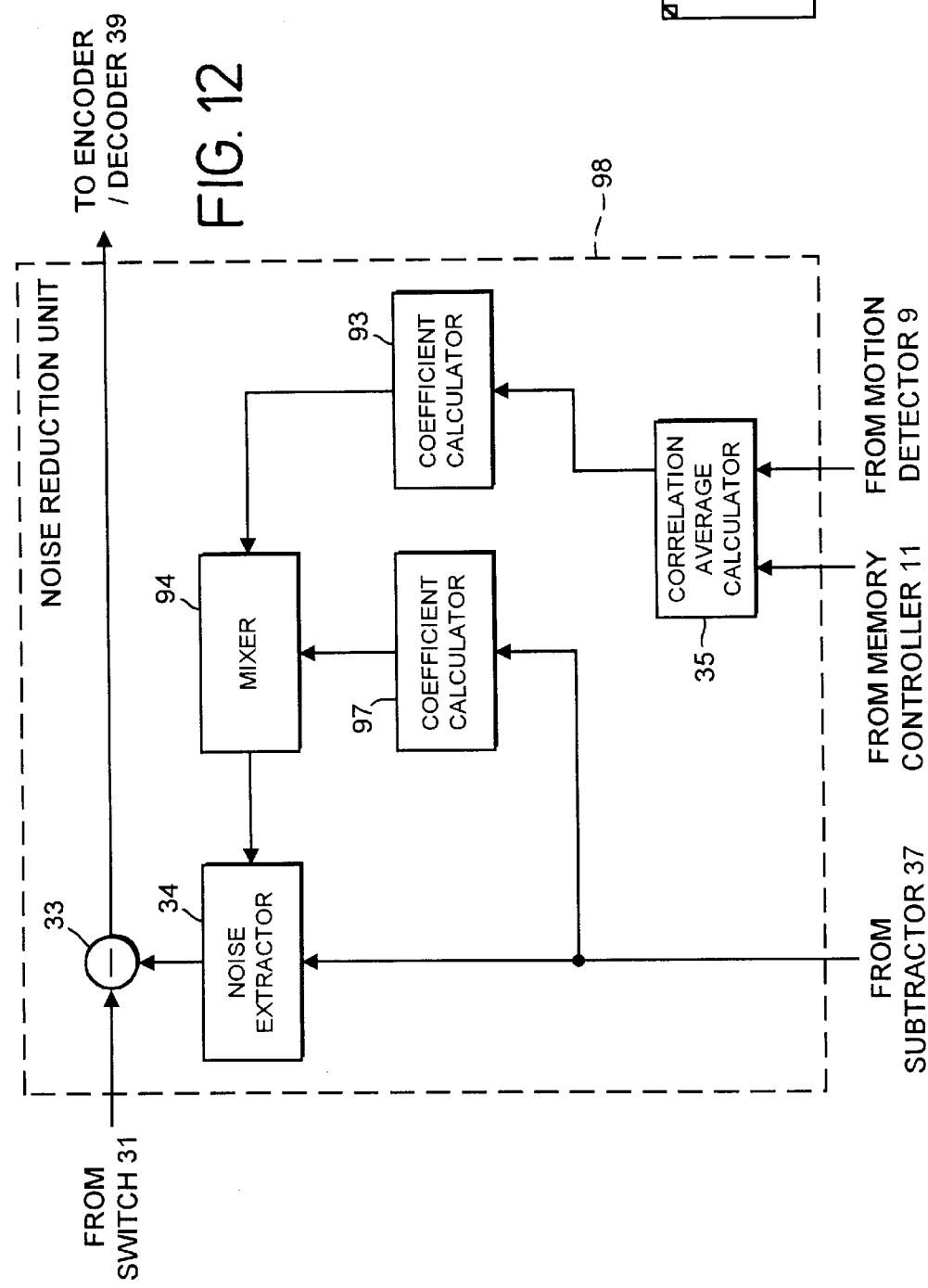
FIG. 12 is a block diagram showing another embodiment of the present invention.

FIG. 12 is a block diagram showing another embodiment of this invention. In FIG. 12, the same components as those shown in FIG. 11 are assigned with the same marks, and the explanation of them will be omitted.

In this embodiment, a part that the noise reduction unit 98 adopting a coefficient calculator 97 substituting for the coefficient calculator 92 is defined is different from the embodiment shown in FIG. 11. The subtracter 37 (see FIG. 1) produces the inter-frame non-correlation component by comparing the reference picture data and the current frame picture data from the memories 2 and 8 on pixel by pixel basis. The subtracter 37 provides the non-correlation component not only to the noise extractor 34 but also to the coefficient calculator 97.

The coefficient calculator 97 calculates the NR coefficient based on the average value of the single pixel non-correlation component or the plural pixels non-correlation component, so as to provide the NR coefficient to the mixer 94. The mixer 94 provides one of the NR coefficients from the coefficient calculators 93 and 97 or the NR coefficient which is mixed at the predetermined ratio to the noise extractor 34.

The operation of the embodiment in such arrangement will now be explained.

The motion detector 9 provides the correlation of the block-of-interest of the current frame and its reference picture block to the correlation average calculator 35. The correlation average calculator 35 stores therein the correlation of the block-of-interest, and calculates the average of the correlations of the blocks on the periphery of the block-of-interest, so as to provide the average value to the coefficient calculator 93. The coefficient calculator 93 calculates the NR coefficient based on the average value of the input plural correlations to be output therefrom.

Figure 13:
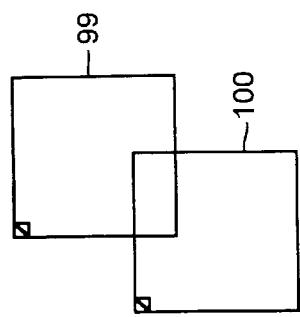
FIG. 13 is a flow chart for explaining the inter-pixel correlation.

The subtracter 37 detects the non-correlation components between the reference picture data and the current frame picture data on each pixel, and provides the non-correlation components to the coefficient calculator 97. FIG. 13 illustrates the correlation of each pixel. The average of a difference amount or some difference amounts between the predetermined pixel (slanting lines area) of the block-of-interest 99 in the current frame and the pixel (slanting lines area) of the corresponding block 100 in the reference frame is applied to the coefficient calculator 97 as the correlation.

The coefficient calculator 97 calculates the NR coefficient based on the average value of the signal pixel non-correlation component or the plural pixels non-correlation component. The mixer 94 provides, for instance, one of the NR coefficient from the coefficient calculators 93 and 97 to the noise extractor 34.

Other operations are the same as those shown in FIG. 11.

Further, this embodiment is also used for the noise elimination of the chrominance signal. For instance, it is assumed that the chrominance signal and the luminance signal are input via the input terminal 1 by being time-multiplexed with each other, and each unit is possible to carry out the time-multiplexing for the luminance signal and the chrominance signal. In this case, the motion detector 9, as the same as the explanation mentioned above, applies the correlation between the luminance signal of the reference picture block and that of the block-of-interest in the current frame to the correlation average calculator 35. The subtracter 37 produces the non-correlation components between the current frame chrominance signal and the reference picture chrominance signal on each pixel, and provides the non-correlation components to the coefficient calculator 97 when the chrominance signal is input. The coefficient calculator 97 calculates the NR coefficient based on the average value of the chrominance signal non-correlation component. Here, the subtracter 37 provides the non-correlation component about the chrominance to the coefficient calculator 97 when the chrominance signal is input.

The mixer 94 applies the NR coefficient based on the outputs from the coefficient calculators 92, 93, and 97 to the noise extractor 34 at the time of the noise eliminating to the chrominance signal. Thus, the noise extractor 34 time-diffusion extracts the noise component contained in the luminance signal and that contained in the chrominance signal using the NR coefficients which are corresponding each luminance signal input time and the chrominance signal input time. The subtracter 33 cancels the noise component contained in the luminance signal from the input luminance signal at the time of the luminance signal processing, and also cancels the noise component contained in the chrominance signal from the input chrominance signal at the time of the chrominance signal processing, and provides the noise reduced signals therefrom.

Accordingly, in this embodiment, the same effect as that shown in FIGURE is obtained, and further, it can also obtain the desired noise reduction effect according to the mixing ratio of the mixer 94. Further, it an control the elimination of the noise component on the pixel-by-pixel. As a result, it is able to implement precise control than the embodiment shown in FIG. 11. It cancels not only the noise of the luminance signal but also the noise of the chrominance signal. And, it can omit the chrominance motion vector detection device in the noise elimination of the chrominance signal.

Figure 14:
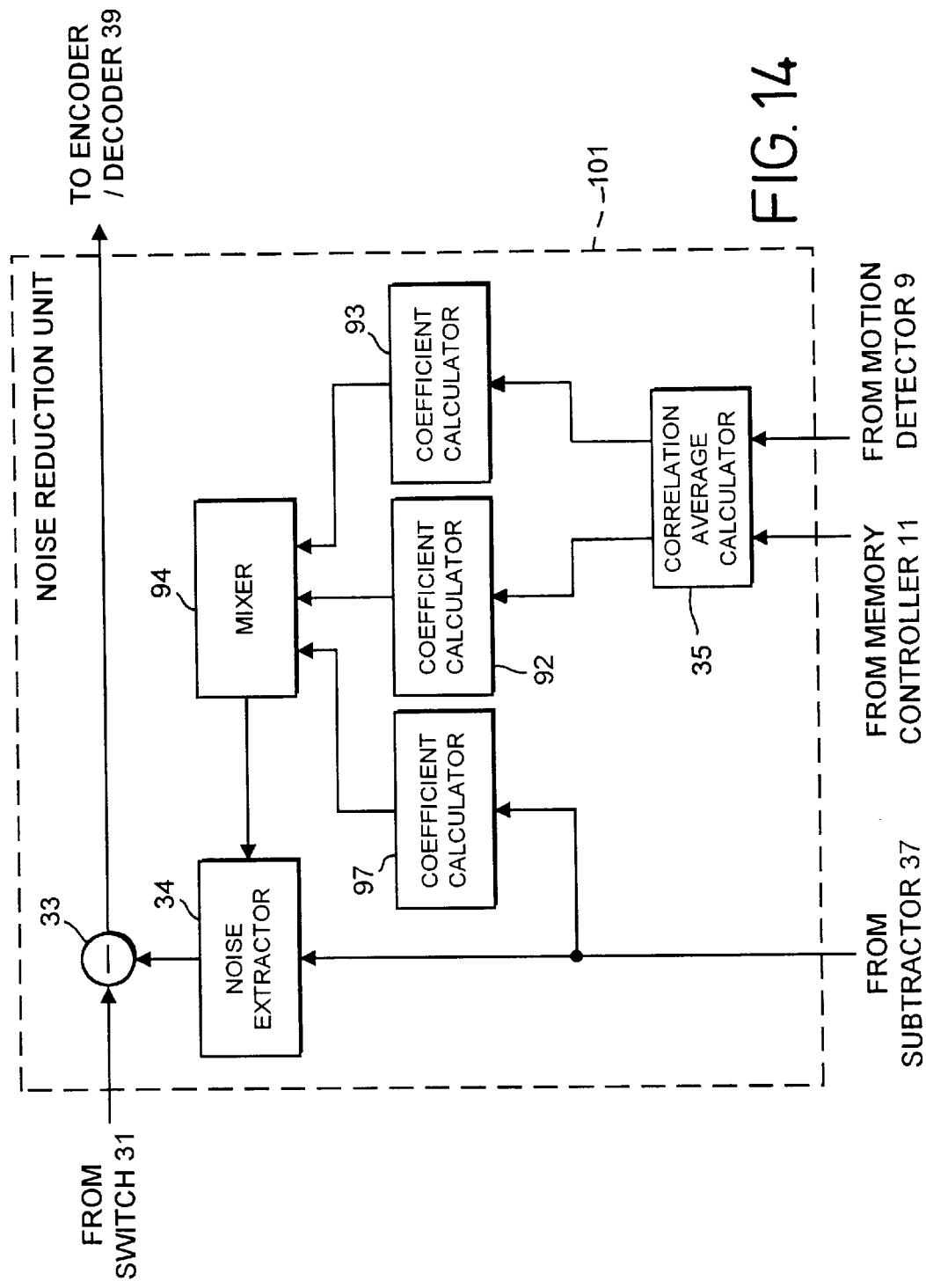
FIG. 14 is a block diagram showing another embodiment of the present invention.

FIG. 14 is a block diagram showing another embodiment of the present invention. In FIG. 14, the same components as those shown in FIGS. 11 and 12 are assigned with the same marks, and the explanations of them will be omitted.

The embodiment of FIG. 14 is different from those as shown in FIGS. 11 and 12 in that it comprises a noise reduction unit 101 having the coefficient calculators 92, 93, and 97 and the mixer 94 in place of the coefficient calculator 36 shown in FIG. 1.

The mixer 94 provides one of the NR coefficients output from the coefficient calculators 92, 93, and 97 or the NR coefficient which are obtained by mixing two of them at the predetermined ratio to the noise extractor 34.

In the embodiment in such arrangement, to the mixer 94, the NR coefficient based on the correlation between the reference picture block and the block-of-interest of the current frame, the NR coefficient based on the correlations between the reference picture block and the blocks on the periphery of the block-of-interest of the current frame, and the NR coefficient based on the non-correlation component on pixel-by-pixel between the reference picture data and the current frame picture data are applied . The mixer 94 provides, for instance, a NR coefficient which is obtained by mixing these NR coefficients mentioned above at the predetermined ratio to the noise extractor 34. It is able to obtain the desirable noise reduction characteristics by defining the mixing ratio of the mixer 94.

In this embodiment also, the luminance signal and the chrominance signal are input via the input terminal 1 by being time-multiplexed with each other. Thus the subtracter 37 produces the non-correlation components of each pixel between the current frame chrominance signal and the reference picture chrominance signal and provides the non-correlation components to the coefficient calculator 97. As a result, it is able to calculate the NR coefficient of the chrominance signal. Accordingly, in this embodiment, it can also reduce the noise of the chrominance signal.

As described above, in this embodiment, the same effects as those shown in FIGS. 11 and 12 are also obtained.

In each embodiment, the noise reduction unit is taking the recursive arrangement. However, it is obvious that it can take either recursive or non-recursive arrangement.

As described above, not only the present invention can provide an extremely preferable noise reduction apparatus which has the enough noise reduction effect, but also the present invention has the effect to prevent the visible flickering in each block.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefor, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. A noise reduction apparatus, comprising:
  encoding means, having a memory means for storing picture data of a different picture calculated from a current picture and a reference picture, and a motion detecting means for detecting motion between the current picture and the reference picture on a block by block basis, for encoding a current picture data or for predictive-encoding an inter-pixel difference between blocks of the current picture data and a reference picture data block based on results of the motion detection;

correlation calculating means for calculating at least an additional correlation between a first correlation and a second correlation, wherein the first correlation is between a block-of-interest in the current picture used for the predictive encoding and the reference picture block and the second correlation is between blocks on a periphery of the block-of-interest and the reference picture block;

coefficient calculating means for generating a noise coefficient for reducing noise based on at least the additional correlation between the first and second correlations;

noise extracting means for extracting a noise component based on the inter-pixel difference between the current picture data and the reference picture data, and the noise coefficient; and subtraction means for subtracting the noise component from an input picture data so as to cancel the noise.

2. A noise reduction apparatus as claimed in claim 1, wherein said motion detecting means detects the reference picture block by a matching operation of the pixel by pixel among the blocks within a predetermined search area which are centering around the reference picture block on position corresponding to that of the block-of-interest in the current picture; and said correlation calculating means outputs the matching calculating results from the motion detecting means as the first and the second correlations.

3. A noise reduction apparatus as claimed in claim 1, wherein the correlation calculating means and the noise extracting means have memories for storing the reference picture data, while reading-out the reference picture data in intra-frame encoding mode.

4. A noise reduction apparatus as claimed in claim 1 wherein the correlation calculating means and the noise extracting means read out the reference picture data from the memory means in the encoding means even in intra-frame encoding mode.

5. A noise reduction apparatus as claimed in claim 1 wherein the noise extracting means extracts a noise component based on the inter-pixel difference obtained by the encoding means and the noise coefficient.

6. A noise reduction apparatus as claimed in claim 5, wherein an inter-pixel correlation calculating means for generating a third correlation based on an inter-pixel difference between the block-of-interest in the current picture and the reference picture block;

said coefficient calculating means for generating a second and a third noise coefficient based on the second correlation calculated by the correlation calculating means and third correlation respectively; and said noise extracting means uses one of the second or the third noise coefficients as the noise coefficient or uses both of them by mixing at a predetermined ratio.

7. A noise reduction apparatus as claimed in claim 6, wherein the coefficient calculating means generates not only the noise coefficient based on one of the first and second correlations calculated for a luminance signal, but also the noise coefficient to a chrominance signal by a third correlation based on an inter-pixel difference about the chrominance signal obtained by the encoding means, and the noise extracting means extracts the noise component contained in the chrominance signal using the noise coefficient calculated by using the luminance signal and the noise coefficient to the chrominance signal.

8. A noise reduction apparatus as claimed in claim 5, wherein the coefficient calculating means generates not only first and second noise coefficients based on the first and second correlations calculated by the correlation calculating means but also a third noise coefficient based on a third correlation calculated by an inter-pixel correlation calculating means, and the noise extracting means uses one of a first through third noise coefficients as the noise coefficient or uses at least two of them by mixing at a predetermined ratio.

9. A noise reduction apparatus as claimed in claim 8, wherein the coefficient calculating means generates not only the noise coefficient based on one of the first and second correlations calculated for a luminance signal, but also the noise coefficient to a chrominance signal by a third correlation based on an inter-pixel difference about the chrominance signal obtained by the encoding means, and the noise extracting means extracts the noise component contained in the chrominance signal using the noise coefficient calculated by using the luminance signal and the noise coefficient to the chrominance signal.

10. A noise reduction apparatus as claimed in claim 1, wherein said coefficient calculating means generates not only a first noise coefficient based on the first correlation calculated by the correlation calculating means but also a second noise coefficient based on the second correlation from the correlation calculating means; and said noise extraction means uses one of the first and the second noise coefficients as the noise coefficient or using both of them by mixing at a predetermined ratio.

11. A noise reduction apparatus as claimed in claim 1, wherein an inter-pixel correlation calculating means generates a third correlation based on an inter-pixel difference between the block-of-interest in the current picture and the reference picture block;

said coefficient calculating means generates not only a second noise coefficient based on the second correlation calculated by the correlation calculating means but also a third noise coefficient based on the third correlation; and said noise extracting means uses one of the second and the third noise coefficients as the noise coefficient or uses both of them by mixing at a predetermined ratio.

12. A noise reduction apparatus as claimed in claim 11, wherein the coefficient calculating means generates not only the noise coefficient based on one of the first and second correlations calculated for a luminance signal, but also the noise coefficient to a chrominance signal by a third correlation based on an inter-pixel difference about the chrominance signal obtained by the encoding means, and the noise extracting means extracts the noise component contained in the chrominance signal using the noise coefficient calculated by using the luminance signal and the noise coefficient to the chrominance signal.

13. A noise reduction apparatus as claimed in claim 1, wherein the coefficient calculating means generates not only first and second noise coefficients based on the first and the second correlation calculated by the correlation calculating means but also a third noise coefficient based on a third correlation calculated by an inter-pixel correlation calculating means, and the noise extracting means uses one of a first through third noise coefficients as the noise coefficient or uses at least two of them by mixing at a predetermined ratio.

14. A noise reduction apparatus as claimed in claim 13, wherein the coefficient calculating means generates not only the noise coefficient based on one of the first and second correlations calculated for a luminance signal, but also the noise coefficient to a chrominance signal by a third correlation based on an inter-pixel difference about the chrominance signal obtained by the encoding means, and the noise extracting means extracts the noise component contained in the chrominance signal using the noise coefficient calculated by using the luminance signal and the noise coefficient to the chrominance signal.

15. A noise reduction apparatus, comprising:

decoding means, to which encoded data resulting from encoding only current picture data or by predictive encoding an inter-pixel difference between blocks of the current picture data and a reference picture data are inputted, for decoding not only the current picture data and the inter-pixel difference, but also the current picture data by adding a decoded difference between the inter-pixel difference to the reference picture data read-out from a memory means by using the memory means storing the reference picture data;

correlation calculating means, to which outputs are applied from the decoding means and the memory means, for calculating a first correlation between a block-of-interest in the current picture and a reference picture block and a second correlation between blocks on the periphery of the block-of-interest in the current picture and the reference picture block;

coefficient calculating means for generating a noise coefficient based on at least an additional correlation between the first and the second correlations to reduce the noise, noise extracting means for extracting noise components based on an inter-pixel difference between a current picture data and a reference picture data and the noise coefficient; and subtraction means for eliminating the noise by subtracting a noise component from a picture data to be input.

* * * * *